United States Patent [19]

Arroyo et al.

[11] Patent Number: 4,595,793
[45] Date of Patent: Jun. 17, 1986

[54] FLAME-RESISTANT PLENUM CABLE AND METHODS OF MAKING

[75] Inventors: Candido J. Arroyo, Lilburn; Palmer D. Thomas, Tucker, both of Ga.

[73] Assignees: AT&T Technologies, Inc., Berkely Hgts.; AT&T Bell Laboratories, Murray Hill, both of N.J.

[21] Appl. No.: 661,889

[22] Filed: Oct. 18, 1984

Related U.S. Application Data

[63] Continuation-in-part of Ser. No. 518,582, Jul. 29, 1983, abandoned.

[51] Int. Cl.⁴ .............................................. H01B 7/02
[52] U.S. Cl. ................................. 174/121 A; 156/53; 156/56; 174/121 SR
[58] Field of Search ........ 174/121 A, 121 R, 121 SR; 156/53, 56

[56] References Cited

U.S. PATENT DOCUMENTS

| | | | |
|---|---|---|---|
| 2,691,694 | 10/1954 | Young | 174/121 R |
| 3,425,865 | 2/1969 | Shelton, Jr. | 174/121 R |
| 3,903,354 | 9/1975 | Dageforde | 174/107 |
| 4,150,249 | 4/1979 | Pedersen | 174/36 |
| 4,151,366 | 4/1979 | Betts et al. | 174/116 |
| 4,154,976 | 5/1979 | Brorein | 174/115 |
| 4,284,842 | 8/1981 | Arroyo et al. | 174/107 |
| 4,327,001 | 4/1982 | West et al. | 428/378 |
| 4,401,845 | 8/1983 | Odhner et al. | 174/121 A X |
| 4,510,348 | 3/1983 | Arroyo et al. | 174/121 A |

OTHER PUBLICATIONS

Brochure; Business Machine Fabrics Technical Mannual; Albany International Precision Components Division.
Technical Data Sheet; Nomex ® Tapes and Cloth Style X-547; W. S. Libbey Co.
Brochure Bulletin NX-17; Properties or Nomery Aramid Filament Yarns; Dec. 1981; DuPont.
Tagt High Temperatures Lead Wire; Radix Wire Co.; 2/72; Cleveland, Ohio 44132.
Brochure; Kynar ® for Electrical/Electronic Applications Now/UL Classified for Plenum Cable Use.
Brochure; Kynar ® A Versatile Engineering Resin with a Unique Balance of Physical and Chemical Properties for a Wide Range of Applications.
Fasig E. W.; Performance of Fluoropolymer Wire and Cable Insulation in Large-Scale Tests for Flammability, Smoke, Corrosive Off-Gases and Circuit Integrity 26th Internat. Wire & Cable Symposium; Cherry Hill, N.J.
Brochure Bulletin K-5; Characteristics and Uses of Kelvar ® 11/16/77, Aramid High Molecular Organic Fiber; DuPont, 9/81.

Primary Examiner—A. T. Grimley
Assistant Examiner—Morris H. Nimmo
Attorney, Agent, or Firm—E. W. Somers

[57] ABSTRACT

A relatively small pair size cable (20) comprising at least one conductor (22) which is insulated with polyvinyl chloride plastic material is provided with a flame retardant, smoke suppressive non-metallic sheath system (30). The sheath system has a relatively low thermal conductivity and provides a predetermined delay prior to the thermal decomposition of the conductor insulation. It includes an inner layer (31) of an aramid fibrous material which has a relatively high compressibility, a relatively low heat absorptivity, and a relatively low air permeability. The inner layer is enclosed by an outer jacket (40) of a fluoropolymer plastic material which is extruded about the inner layer.

17 Claims, 7 Drawing Figures

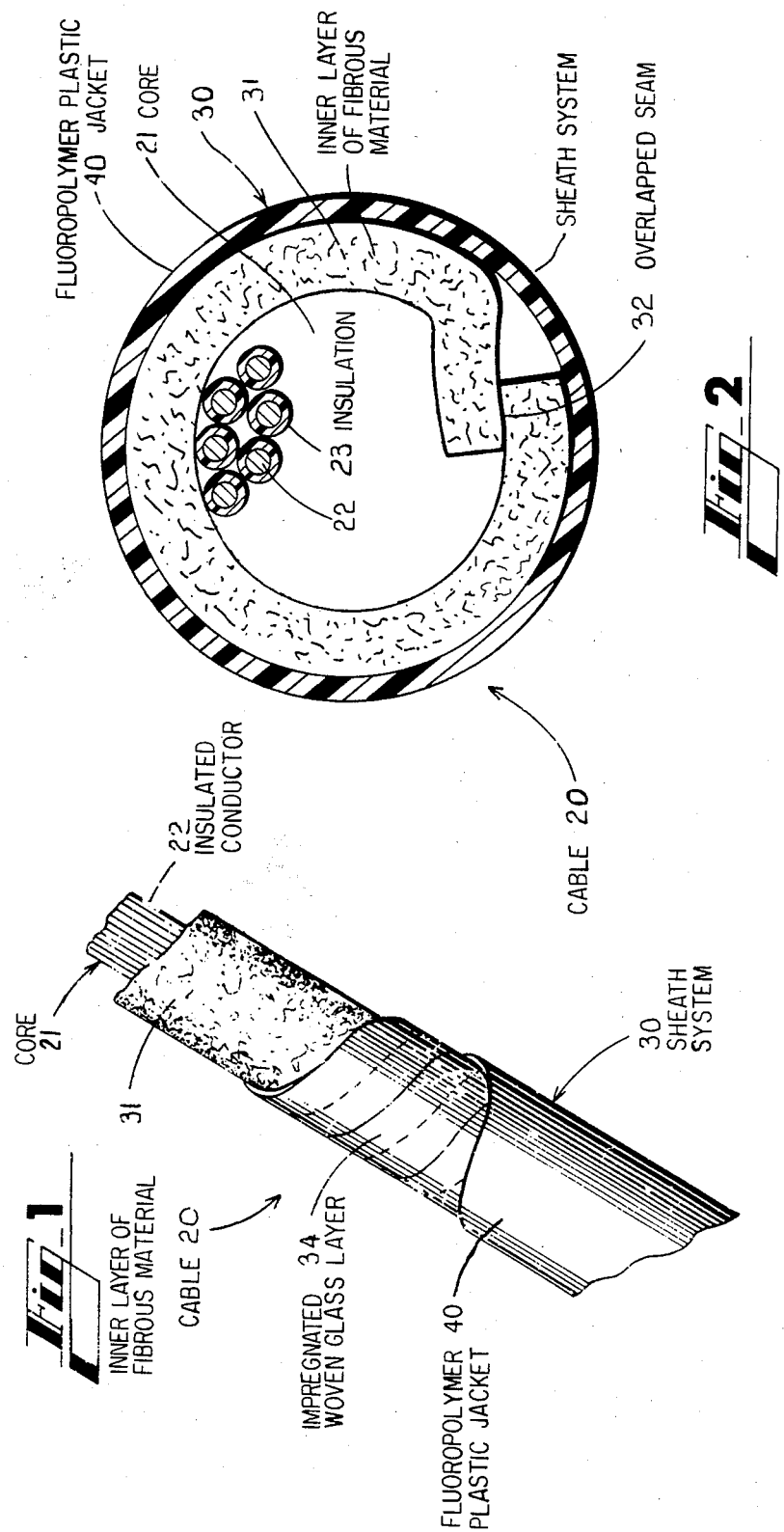

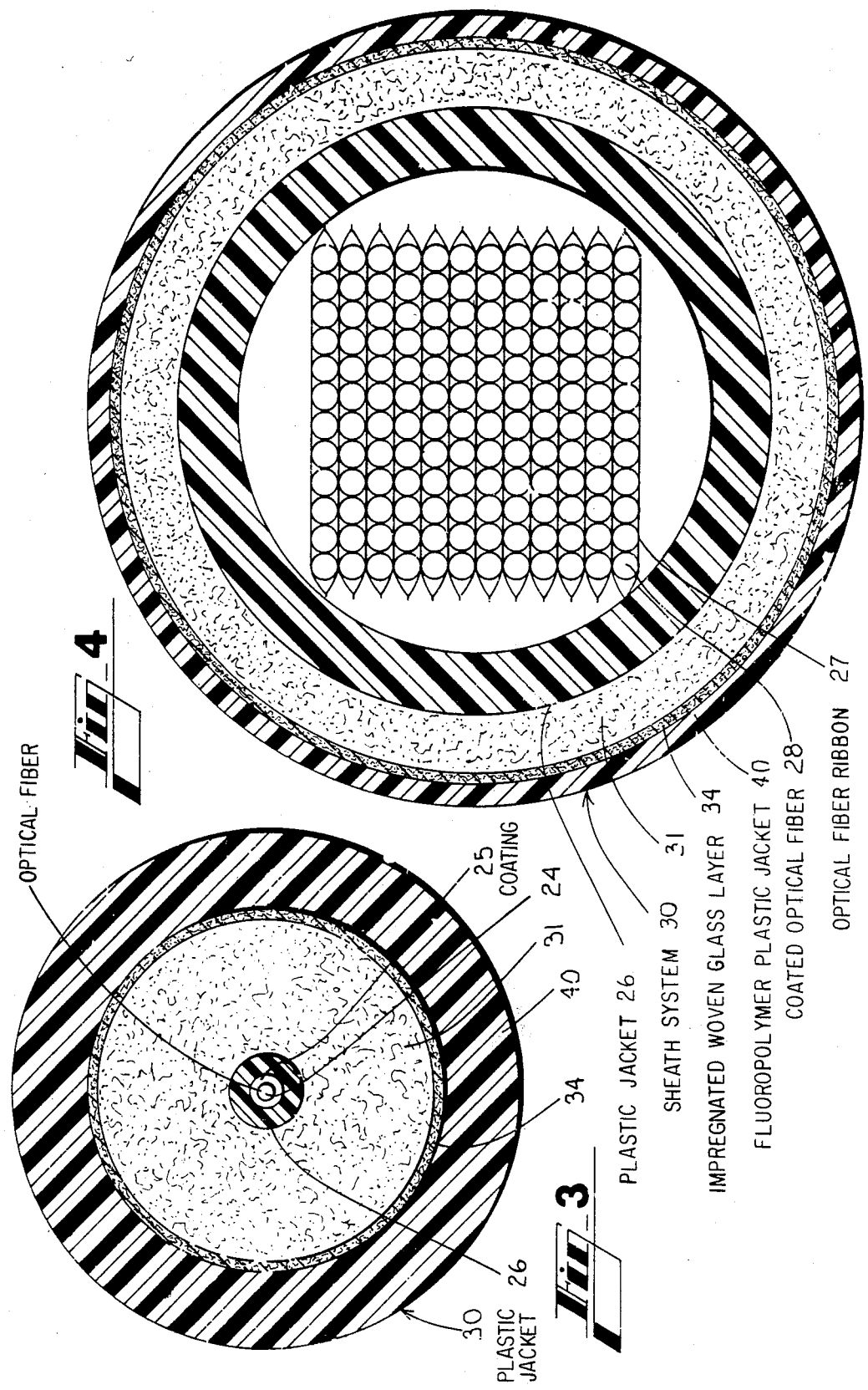

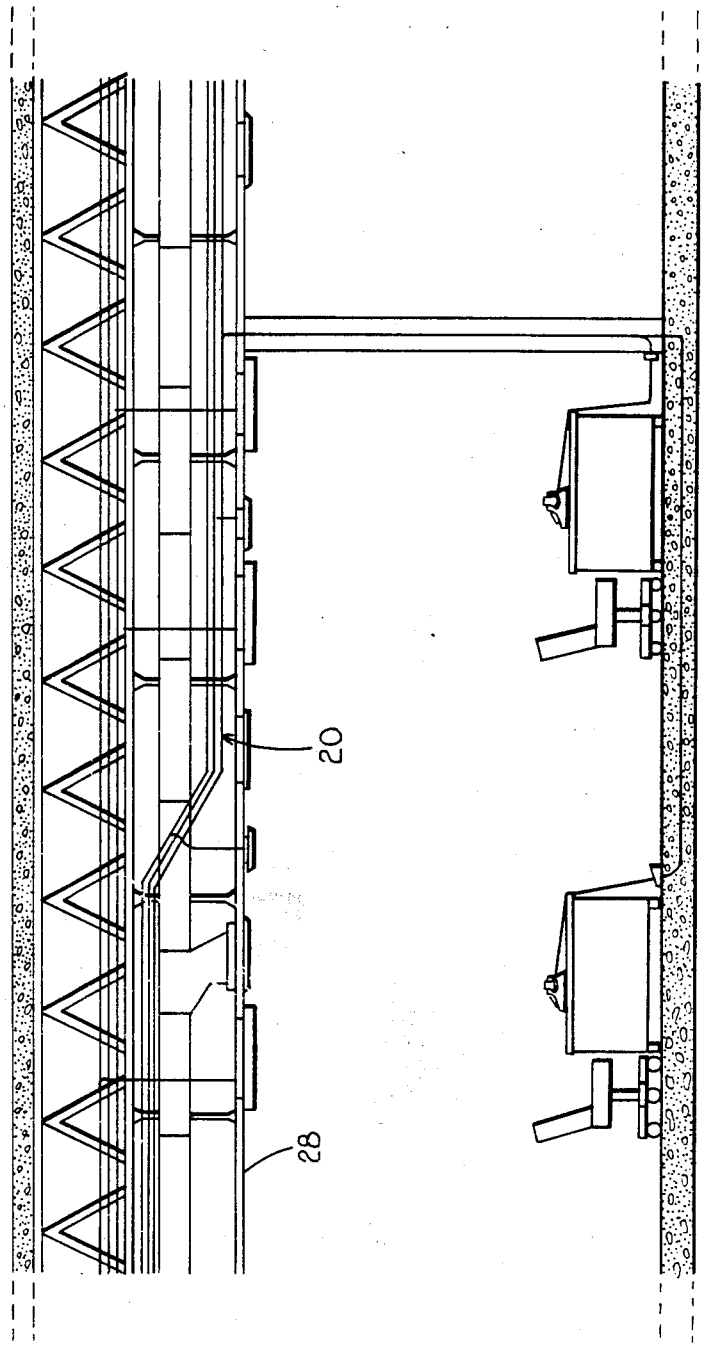

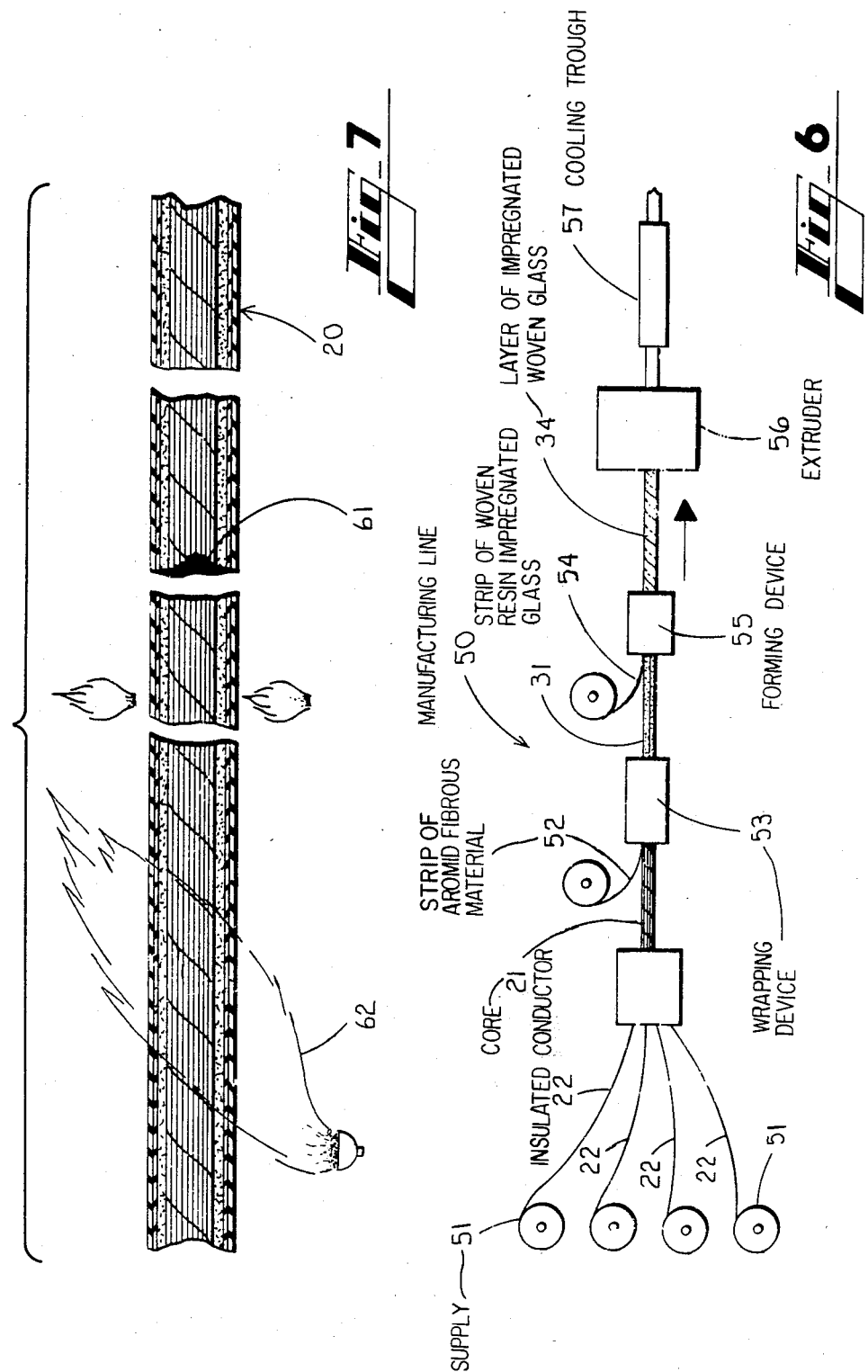

FLAME-RESISTANT PLENUM CABLE AND METHODS OF MAKING

This is a continuation-in-part, of application Ser. No. 518,582, filed July 29, 1983 now abandoned.

TECHNICAL FIELD

This invention relates to a non-shielded plenum cable having resistance to flame spread and smoke evolution and to methods of making it. More particularly, it relates to a relatively small pair size cable which is ideally suited for telecommunications use in building plenums and which includes an outer jacket which is made of an extrudable material.

BACKGROUND OF THE INVENTION

In the construction of many buildings, a finished ceiling, which is referred to as a drop ceiling, is spaced below a structural floor panel that is constructed of concrete, for example. Light fixtures as well as other items are supported by the drop ceiling. The space between the ceiling and the structural floor from which it is suspended serves as a return-air plenum for elements of heating and cooling systems as well as a convenient location for the installation of communications, computer and alarm system cables. It is not uncommon for these plenums to be continuous throughout the length and width of each floor.

When a fire occurs in an area between a floor and a drop ceiling thereabove, it may be contained by walls and other building elements which enclose that area. However, if and when the fire reaches the plenum, and if flammable material occupies the plenum, the fire can spread quickly throughout an entire story of the building and smoke can be conveyed through the plenum to adjacent areas. The fire could travel along the lengths of cables which are installed in the plenum.

Generally, a cable in which the sheath comprises only a plastic jacket does not exhibit what are now totally acceptable flame spread and smoke evolution properties. As the temperature in such a cable rises, charring of the jacket material begins. Afterwards, conductor insulation inside the jacket begins to decompose and char. If the jacket char retained its integrity, it could function to insulate the core; if not, it is ruptured by the expanding insulation char, exposing the virgin interior of the jacket and insulation to elevated temperatures. The jacket and the restricted insulation char begin to pyrolize and emit flammable gases. These gases ignite and, by convection, burn beyond the area of flame impingement, propagating flame and evolving smoke.

Because of the possibility of flame spread and smoke evolution, the National Electric Code (NEC) requires that electrical cables in plenums be enclosed in metal conduits. Since rigid metal conduits are difficult to route in plenums congested with other items, a rearrangement of office telephones is extremely expensive. However, the code permits certain exceptions to this requirement. For example, flame-resistant, low smoke-producing cables without metallic conduit are permitted provided that such cables are tested and approved by an authority such as the Underwriters' Laboratories. What is needed for use in buildings is a cable which is relatively inexpensive to manufacture, but which meets the NEC requirements for flame retardance and smoke evolution, and which has suitable mechanical properties such as flexibility.

In the marketplace, cable which comprises a core enclosed in a paper wrap and in a relatively thick metallic shield is available, but it is relatively inflexible and somewhat difficult to maneuver in plenums. Also, care must be taken during installation to guard against possible electrical shock which may be caused by the metallic shield of the above-described cable engaging exposed electrical service wires or equipment. One commercially available fluorine-containing polymer material has been accepted as the primary insulative covering for conductors and as a jacketing material for plenum cable without the use of metal conduit. However, that material has a relatively high dielectric constant which makes it unattractive as insulation for communications conductors. It would be most advantageous if the conductors could be insulated with a relatively inexpensive material such as polyvinyl chloride (PVC).

A plenum cable that has superior resistance to flame spread and smoke evolution is shown in U.S. Pat. No. 4,284,842 which issued on Aug. 18, 1981 in the names of C. J. Arroyo, N. J. Cogelia and R. J. Darsey and which is incorporated by reference hereinto. It includes a reflective sheath system which encloses a core and which comprises a layer that is made of a core wrap material and a metallic barrier having longitudinal edge portions that form a seam. The metallic barrier which reflects radiant heat outwardly is covered with two translucent tapes. Each tape is wrapped helically about the core with overlapped sealed seams.

The foregoing sheath system, which depends on its reflection characteristics to keep the heat away from the core is well suited to larger pair size plenum cables. However, for smaller pair size cables such as those containing twenty-five pairs or less, the use of a metallic shield is not only expensive, but is very difficult to form about the core. Also, inasmuch as the metallic barrier reflects heat, manufacturing line speeds must be low enough to allow sufficient heat energy to be transferred to adhesive on the tapes to seal the seams.

In one prior art small pair size cable, the core is protected by a non-metallic sheath system having a relatively low thermal conductivity. See application Ser. No. 479,249 filed Mar. 28, 1983, in the names of C. J. Arroyo et al, now U.S. Pat. No. 4,510,348. The sheath system includes an inner layer of an inorganic cellular material which has a relatively low air permeability. The jacket comprises at least one tape which is made of a flame retardant, thermosetting material and which is wrapped helically about the cellular layer.

What is still sought is a less expensive, flame retardant, smoke suppressive sheath system for a relatively small pair size plenum cable. The sought after cable desirably is easier to manufacture than presently available products and includes an outer jacket comprising a material that is capable of being extruded instead of being wrapped about the core.

SUMMARY OF THE INVENTION

The foregoing needs have been met by the cable of this invention which includes a core comprising at least one insulated conductor that may be a metallic or a lightguide fiber conductor. The cable is protected by a nonmetallic sheath system having a relatively low thermal conductivity. Such a sheath system is effective to provide a predetermined time delay before any thermal decomposition of the conductor insulation when the cable is subjected to relatively high temperatures. More particularly, the sheath system includes an inner layer of a fibrous material which encloses the core and which has a relatively low heat absorptivity and a relatively low air permeability. An outer jacket of an extrudable plastic material which comprises a fluorinated polymer plastic material encloses the layer of fibrous material. In a preferred embodiment for the larger of the small pair size cables, a woven glass layer which is impregnated with a fluorocarbon resin is interposed between the fibrous layer and the outer jacket. This added layer helps to minimize the ingress of convective heat into the core and to minimize notching of the jacket material.

A preferred core wrap for the inner layer of the sheath system, which replaces prior art sheath system components such as aluminum and glass, is characterized also by a relatively high compressibility. It comprises a blend of NOMEX ® aramid filament yarns and of KEVLAR ® aramid, high modulus organic fibers. The major mode of heat resistance is the relatively low heat absorption provided by the NOMEX ®/KEVLAR ® core wrap material and the superior resistance to high temperatures by the extruded outer jacket which may be a polyvinylidene fluoride plastic material.

The cable of this invention is particularly useful in providing a desired degree of flame retardance for lightguide fiber cables and for small pair size cables which include no more than twenty-five pairs of insulated metallic conductors. Inasmuch as the cable does not include a metallic shield, it is more flexible, thereby facilitating installation. Another advantage of this cable relates to its manufacture. In the prior art cables, outer tapes were wrapped helically in opposite directions with overlapping adjacent turns about the core wrap after which the cable was subjected to heat to cause adhesive material on the tapes to melt and seal the overlapping seams. The wrapping and sealing of tapes are not required with the cable of this invention. Rather the outer layer of a fluoropolymer material such as polyvinylidene fluoride plastic material is extruded over the inner layer with conventional tooling.

BRIEF DESCRIPTION OF THE DRAWINGS

Other features of the present invention will be more readily understood from the following description of specific embodiments thereof when read in conjunction with the accompanying drawings in which:

FIG. 1 is a perspective view of a cable of this invention which includes a sheath system that has superior flame and smoke retardance properties;

FIG. 2 is an end view of another embodiment of a cable sheath system of this invention;

FIGS. 3 and 4 are end cross-sectional views of lightguide cables which embody the cable sheath of FIG. 1;

FIG. 5 is an elevational view of a portion of a building to show an environment in which the cable of this invention may be used;

FIG. 6 is a schematic view of a portion of a manufacturing line which is used to make the cable of this invention; and FIG. 7 is an elevational view of a portion of a length of cable being subjected to a flame in a test apparatus and shows the condition of the cable as a result of its exposure to the flame.

DETAILED DESCRIPTION

Referring now to FIGS. 1 and 2, there is shown a communications cable, which is designated generally by the numeral 20 and which is flame retardant and smoke suppressive. It includes a core 21 having a relatively small number of pairs of individually insulated conductors 22—22. Generally, insulation 23 which covers each of the conductors of the core is a flame retardant plastic material such as, for example, polyvinyl chloride (PVC). The core 21 typically includes a number of insulated conductor pairs, e.g. less than twenty-five pairs, which is relatively low compared to the number included in a stub cable which services a building. The core 21 could be one which is suitable for use in communications, computer and alarm signalling networks.

It should be realized that the core 21 also may be one which is used in lightwave communications. As such, it could include a single lightguide fiber 24 (see FIG. 3) which is coated with a protective material 25 and enclosed in a sheath that includes strength members and a fire retardant plastic jacket 26. Or, it could include one or more lightguide fiber ribbons 27—27 (see FIG. 4) each comprising a plurality of coated fibrs 28—28. Ribbon cables are described in an article authored by Frank T. Dezelsky, Robert B. Sprow and Francis J. Topolski and entitled "Lightguide Packaging" which appeared in the Winter 1980 issue of the *Western Electric Engineer* beginning at page 81. Depending on the structure of the conductors themselves, such a cable may have a lower fuel content than a cable which includes insulated metallic conductors.

As should become apparent from test results disclosed hereinafter, the cable 20 of this invention satisfies a long felt need for a relatively small pair size cable which is specially suited for use in a builidng plenum 28 (see FIG. 5). Such a cable must meet stringent requirements for flame spread and smoke evolution as well as those for mechanical and electrical safety.

Turning again to the cable of this invention as shown in FIGS. 1-2, it can be seen that the core 21 is enclosed with a sheath system 30. The sheath system 30 which is non-metallic and which is characterized by a relatively low thermal conductivity delays for a predetermined time heat transfer into the core 21. Typical of the thermal conductivity values of the sheath 30 are those in the range of about 0.0001 to 0.001 cal. cm/cm$^2$ sec. °C.

As can be seen in the drawings, the sheath system 30 includes a core wrap or inner layer 31 which comprises a heat resistant fibrous material which has a relatively low air permeability and a relatively low heat absorptivity. Air permeability of a material is defined as the rate of air flow through the material under a given differential pressure. An air permeability in the range of 0 to 200 cfm is acceptable.

Flame resistance and smoke suppression are enhanced because the inner layer 31 has a relatively low heat abosrptivity. Absorptive power or the absorptivity of a material is measured by the fraction of the radiant energy falling upon the material which is absorbed or transformed into heat. It is the ratio of the radiation absorbed by any material to that absorbed under the same conditions by a so-called black body. An arrangement or a material which will absorb all the radiant energy at all wavelengths and reflect none is called a perfect black body. This ratio varies with the character of the surface and the wavelength of the incident energy. In a chart on page E225 of the 54th edition of the *Handbook of Chemistry and Physics* as published by the CRC Press of Cleveland, Ohio, the coefficient of absorption of black matter is given as 0.97 whereas that for white lead paint is 0.25.

In a preferred embodiment, the inner layer 31 comprises an aramid fibrous material which is yellowish in color and which has a heat absorptivity of about 0.45. It is characterized also by a relatively high compressibility. An aramid fiber is defined as a long chain synthetic polyamide having at least 85% of its amide linkages attached directly to two aromatic rings. Aramid fibers exhibit low flammability, high strength and high modulus.

The inner layer 31 may be made of a non-woven aramid fibrous material which has a relatively high compressibility and which is preferred, or it may be woven. A non-woven fabric is an assembly of textile fibers held together by mechanical interlocking in a random web or mat, by fusing of the fibers or by bonding them with a cementing medium. Woven fabric is comprised of two sets of yarns, warp and filling and is formed by weaving, which is the interlacing of these sets of yarns to form a fabric.

The inner layer 31 preferably is relatively resilient so that it is capable of being compressed by the PVC conductor insulation 23 when it intumesces and expands under the application of heat. During a fire, the core chars. If this char is not allowed to develop, it breaks down and gases are emitted. Desirably, the core wrap 31 conforms to the growth of the char and allows it to develop. As a result, the uncharred PVC insulation is further insulated from the heat.

A NOMEX ® aramid filament yarn which is available from the E. I. DuPont Company may be used for the inner layer 31. It is described in a product brochure designated bulletin NX-17, dated December 1981 and distributed by E. I. DuPont.

It has been found that a material which is a blend of commercially available felts also is suitable for the inner layer. In a preferred embodiment, the blend comprises an aramid filament yarn such as the NOMEX ® aramid filament yarn and KEVLAR ® aramid fiber. KEVLAR ® fiber is described in a product brochure designated Bulletin K-5, dated September 1981 and distributed by the E. I. DuPont Company. The NOMEX ®/KEVLAR ® blend has a thermal conductivity of 0.00024 cal cm/cm$^2$sec.°C. Because the blend is light yellow in color, its heat absorptivity is slightly higher than that of an inner layer 31 comprising the NOMEX ® yarn material which has an off-white natural color.

The thickness of the layer 31 and its uniformity also are important. For example, while for a very small pair size cable, such as four pair, the thickness may be 0.114 cm, a thickness of about 0.137 cm is required for a twenty-five pair size.

The inner layer 31 is wrapped about the core 21 to form a longitudinal overlapped seam 32 which has a width of about 0.32 cm. Although the layer 31 in the preferred embodiment is wrapped to form a longitudinal seam, it could be wrapped helically about the core 21.

Even after relatively long periods of exposure to high temperatures, the core wrap 31 retains a relatively high strength and toughness. For example, NOMEX ® yarn has a low level of flammability and does not melt and flow at high temperatures. KEVLAR ® fiber does not melt nor support combustion but will begin to carbonize at about 427° C. Further, KEVLAR ® fiber is about 43% lighter than Fiberglas ® glass fibers.

Because of its relatively low heat absorptivity and its moderately low air permeability which is in the range of about 128 cfm, the inner layer 31 impedes the flow of convective hot air inwardly toward the core. Also, once the core 21 begins to degrade during a fire, the inner layer 31 impedes the outward flow of gases from the decomposed PVC. This prevents the movement of smoke into a flame front which could cause ignition and flame spread.

The preferred embodiment of the sheath system 30 of this invention for the larger ones, e.g. 25 pair, of the family of small pair size cables is shown in FIGS. 1 and 3-4. In it, the inner layer 31 is enclosed in a layer 34 of woven glass which has been impregnated with a fluorocarbon resin liquid coating and cured in place. The fluorocarbon resin may be a polytetrafluoroethylene (PTFE) resin, for example, which is available from the E. I. DuPont Company. A woven glass strip which has been impregnated with the PTFE resin is available commercially from the Oak Material Group, Inc. under the designation Fluorglas ® tape. Because the layer 34 is woven and because the resin fills the interstices of the woven glass, the layer is characterized by a relatively low air permeability in the range of 31 cfm which minimizes air flow into the core. The layer 34 generally is light cream in color and is also characterized by a relatively low heat absorptivity of about 0.35. Although in the preferred embodiment, it iw wrapped helically about the inner layer 31, the woven glass layer 34 could be wrapped longitudinally.

To provide thermomechanical and dielectric strength, the outer portion of the cable sheath system 30 includes an outer jacket 40 (see FIGS. 1 and 2). This is made of a fluoropolymer plastic material comprising a fluorinated polymer including fluoride ions in the polymer chain. The fluoropolymer plastic material can withstand relatively high temperatures without degradation and is capable of being extruded. In the preferred embodiment, the outer jacket 40 comprises a polyvinylidene fluoride (PVDF) material such as KYNAR ® PVDF material. Such a material which is transparent is described in a brochure designated PL-148-A-3/81-W77020-5M published by the Pennwalt Corporation of Philadelphia, Pennsylvania. The thermal conductivity of the material of the outer jacket 40 is in the range of about 0.00024–0.0003 cal. cm/cm$^2$ sec°C. It has a specific heat of 0.30–0.34 cal./gm/°C. and a limiting oxygen index of 44%. Its initial thermal decomposition occurs above 350° C.

As was mentioned hereinbefore, the cable system of U.S. Pat. No. 4,284,842 includes a metallic strip which is formed into a barrier that encloses a core wrap material. The use of a heat reflective metallic shield, which may be necessary for the higher fuel content higher pair size cables, requires an extra manufacturing step, prevents the use of higher line speeds and results in a cable which for small pair sizes would be somewhat inflexible. The sheath system 30 of this invention which is suitable for cables having a relatively small number of conductor pairs does not include a metallic reflective barrier. Nor does it include an outer jacket comprised of tapes which must be wrapped about the core 21. Instead, the material comprising the jacket 40 is extrudable. The KYNAR ® plastic material has excellent thermal stability and melt processability which facilitate its extrusion.

The components of the sheath system 30 cooperate to provide a system which delays the transfer of heat energy into the core 21 for a predetermined time. Because conductive heat transfer, which decomposes the conductor insulation 23 is delayed, smoke emission and hence further flame spread are controlled. This heat energy, at least for a predetermined time, is delayed by the relatively low thermal conductivity, relatively low heat absorptivity and relatively low air permeability of the layer comprising the core wrap of the blend of aramid fibers.

In the manufacture of the cable 20, a core 21 which may comprise the plurality of conductors 22—22 is advanced along a line 50 (see FIG. 6). The conductors 22—22 are payed off from supplies 51—51. A strip 52 of aramid fibrous material is wrapped about the core 21 by a device 53 to form the inner layer 31 after which a strip 54 of woven resin impregnated glass is formed into the layer 34 about the inner layer 31 by a device 55. The layer 34 presents a relatively smooth surface over which the jacket material is extruded and holds the inner jacket 31 disposed about the core 21 prior to extruding of the jacket 40. As a result, notching of the fluoropolymer plastic material is minimized. Then, the wrapped core is advanced through an extruder 56 wherein an outer jacket of a fluoropolymer material such as KYNAR ® plastic material is caused to enclose the wrapped core. The jacketed cable is advanced through a trough 57 wherein it is cooled by chilled water. The completed plenum cable is taken up on a reel (not shown).

It has been found that the tightness of the enclosure of the sheath system, which comprises the inner layer 31 and the extruded layer 40, about the core, affects the amount of char that is formed, and could increase the evolution of smoke. Accordingly, care must be taken when extruding the outer jacket about the core to avoid undue compression of the inner layer 31. If this precautionary measure were not taken, the layer 31 would be compressed so much during manufacture that its effectiveness as a thermal barrier would be reduced. Also, the PVC charring mechanism would be restricted, and this would lead to the emission of volatile gases which might escape through the seams and ignite donwstream.

Flame spread and smoke evolution characteristics of sample cables may be demonstrated by using a well known Steiner Tunnel test in accordance with A.S.T.M E-84 as modified for communications cables and now referred to as Underwriters' Laboratories Test U.L. 910. Test 910 is a test method for determining the relative flame propagation and smoke generating characteristics of cable to be installed in ducts, plenums, and other spaces used for environmental air. Tests have shown that heat is transferred into the cable core 21 principally by thermal radiation, secondly by conduction and finally by convection. The charring of the PVC insulation along its outwardly facing surface acts to inhibit further degradation of the PVC by blocking internal convective air movements. Charred PVC conductor insulation 61 (see FIG. 7) effectively blocks off a section of the length of cable 20 to localize further PVC decomposition in the portion of the cable adjacent to a flame 62. This prevents the longitudinal travel of heated air which decomposes the insulation and causes smoke evolution.

EXAMPLE 1

A core comprising four pairs of 24 gauge copper conductors individually insulated with a polyvinyl chloride insulation having a thickness of about 0.015 cm was enclosed in a non-woven aramid fiber strip having a thickness of 0.114 cm and a width of 1.27 cm. The strip was formed with a longitudinal overlapped seam having a width of about 0.32 cm. The strip was an ARAMID 912 strip made by the W. S. Libbey Company having a weight of about 66 grams/square meter, an air permeability of about 128 cfm, and a thermal conductivity of 0.00024 cal. cm/cm$^2$ sec.°C. The layer 31 had a thermal diffusivity of 0.023 cm$^2$/sec and an average fiber diameter of 6.35 microns. Over the aramid strip was extruded a jacket made of a KYNAR ® fluoroplastic material. The jacket had a thickness of about 0.038 cm.

This cable was subjected to tests in a Steiner Tunnel in accordance with priorly mentioned Underwriters' Laboratories test UL 910 and exposed to temperatures of 904° C., or incident heat fluxes as high as 6.3 watts/cm$^2$. Cables (1)-(3) having other constructions were tested and are tabulated below in Table 1 with cable (4) being the cable 20 of this invention.

TABLE 1

| Cable Description | Core Wrap | Insulation | No. Cables | Flame Spread (Ft) | Peak Optical Density |
|---|---|---|---|---|---|
| (1) Standard Inside Wiring PVC Jacket | None | PVC | 48 | 11 | 1.1 |
| (2) PVC Jacket in Conduit | | PVC | 30 | 3.5 | 0.38 |
| (3) TEFLON ® -FEP Plastic | Glass | TEFLON ® FEP | 70 | 3.5 | 0.1 |
| (4) Aramid with PVDF Plastic | Aramid Fibrous Material | PVC | 47 | 4.0 | 0.15 |
| (5) UL Test 910 requirements | | | | 5.0 | 0.50 |

EXAMPLE 2

A core comprising twenty-five pairs of 24 gauge copper conductors individually insulated with a PVC insulation having a thickness of about 0.015 cm was enclosed in a non-woven aramid fiber strip. The strip which had a thickness of 0.137 cm and a width of 4.13 cm was made of the same material as the strip in Example 1. Over the aramid strip was wrapped helically a woven glass strip which had been impregnated with a polytetrafluoroethylene resin and which had a thickness of 0.006 cm and a width of 1.9 cm. The woven glass strip had an air permeability of 31.5 cfm and a thermal conductivity of 0.0004 cal. cm/cm$^2$ sec°C. Then a 0.06 cm thick jacket comprising KYNAR ® plastic material was extruded about the wrapped core.

This cable also was subjected to tests in a Steiner Tunnel in accordance with priorly mentioned Underwriters' Laboratories test UL 910 and exposed to temperatures of 904° C., or incident heat fluxes as high as 6.3 watts/cm$^2$. Cables (1)-(4) having other constructions were tested and are tabulated below in Table 2 with cable (5) being the cable 20 of this invention.

TABLE 2

| Cable Description | Core Wrap | Insulation | No Cables | Flame Spread (Ft) | Peak Optical Density |
|---|---|---|---|---|---|
| (1) Standard Inside Wiring PVC Jacket | None | PVC | 24 | 14 | 3.0 |
| (2) PVC Jacket in Conduit | | PVC | 10 | 3.0 | 0.30 |
| (3) TEFLON ®-FEP Plastic | Glass | TEFLON ® FEP | 18 | 3.0 | 0.35 |
| (4) KAPTON ®-Tapes Plus 0.020 cm Aluminum | Glass | PVC | 24 | 4.5 | 0.33 |
| (5) KYNAR ®-PVDF Jacket | NOMEX ®/ KEVLAR ® plus Fluorglas ® | PVC | 26 | 4.0 | 0.39 |
| (6) UL Test 910 requirements | | | | 5.0 | 0.50 |

As can be seen in Tables 1 and 2, the cable 20 of this invention has properties which compare favorably with the PVC cable in a metal conduit and the TEFLON ®-FEP jacketed cable. Not only does it provide very acceptable flame spread protection, but also it is characterized by its ability to inhibit the evolution of smoke. A measure of smoke evolution is termed optical density which is an obscuration measurement over a length of time as seen by an optical detector. The lower the optical density, the lower and hence the more desirable is the smoke characteristic. Typical peak optical density values are 0.30–0.38 for PVC insulated and jacketed cable in metal conduit, 0.1–0.35 for TEFLON ® covered cables and 0.15 to 0.39 for the cable 20 of this invention.

The sheath system 30 of this invention (a) provides relatively low thermal conductivity, relatively low heat absorptivity and relatively low air permeability; (b) effectively delays the effects of radiant energy present throughout the length of the UL tunnel test; (c) delays the transfer of conducted heat to the core 21 which produces less PVC insulation deterioration which in turn produces less smoke and therefore less flame spread; and (d) allows the PVC insulation to char fully thereby blocking convective pyrolysis gas flow along the cable length.

It is to be understood that the above-described arrangements are simply illustrative of the invention. Other arrangements may be devised by those skilled in the art which will embody the principles of the invention and fall within the spirit and scope thereof.

What is claimed is:

1. A cable which resists flame spread and smoke evolution, said cable comprising:
    a core which includes at least one conductor enclosed in a plastic coating; and
    a sheath system which encloses said core and which has a thermal conductivity in the range of about 0.0001 to 0.001 cal. cm/cm$^2$sec°C., said sheath system being effective to provide a predetermined time delay prior to thermal decomposition of the conductor coating when the cable is subjected to a relatively high temperature and including:
    a layer of an aramid fibrous material which encloses said core, said fibrous material having a relatively low air permeability, a relatively low heat absorptivity, and a theral conductivity of about 0.00024 cal. cm/cm$^2$sec°C.; and
    an extruded jacket of a fluoropolymer plastic material which encloses said layer of fibrous material.

2. The cable of claim 1, wherein said core includes a plurality of insulated conductors and wherein each of said conductors is enclosed in an insulative covering comprising a polyvinyl chloride plastic material.

3. The cable of claim 1, wherein said layer of fibrous material is further characterized as having a relatively high compressibility.

4. The cable of claim 1, wherein said jacket is transparent.

5. The cable of claim 1, wherein said fibrous material has a heat absorptivity which does not exceed a value of about 0.45.

6. A cable which resists flame spread and smoke evolution, said cable comprising:
    a core which includes at least one conductor enclosed in a plastic coating; and
    a sheath system which encloses said core and which has a relatively low thermal conductivity, said sheath system being effective to provide a predetermined time delay prior to thermal decomposition of the conductor coating when the cable is subjected to a relatively high temperature and including:
    a layer of aramid fibrous material which encloses said core, said fibrous material having a relatively low air permeability and a relatively low heat absorptivity;
    an extruded jacket of a fluoropolymer plastic material which encloses said layer of fibrous material; and
    a woven glass layer which is impregnated with a fluorocarbon resin and which is interposed between said layer of fibrous material and said jacket.

7. The cable of claim 6, wherein said layer of fibrous material comprises a non-woven fibrous material.

8. The cable of claim 6, wherein said layer of fibrous material comprises a woven fibrous material.

9. A cable which resists flame spread and smoke evolution, said cable comprising:
    a core including at least one conductor which is insulated with polyvinyl chloride plastic material; and
    a non-metallic sheath system which encloses said core and which has a relatively low thermal conductivity, said sheath system being effective to provide a predetermined time delay prior to thermal decomposition of the conductor insulation when the cable is subjected to a relatively high temperature and including:
    an inner layer which encloses said core, said inner layer being made of an aramid fibrous material, said aramid fibrous material having a relatively low air permeability and a relatively low heat absorptivity;
    a woven glass layer which is impregnated with a fluorocarbon resin and which encloses said layer of aramid fibrous material; and an extruded plastic jacket which encloses said woven glass layer and which comprises a polyvinylidene fluoride material.

10. The cable of claim 9, wherein said sheath system has a thermal conductivity in the range of 0.001 to 0.0001 cal-cm/cm$^2$-sec°C.

11. The cable of claim 9, wherein said inner layer comprises a blend of aramid fiber yarns.

12. The cable of claim 9, wherein said inner layer has a relatively high compressibility.

13. The cable of claim 9, wherein said woven glass layer comprises a tape which is wrapped helically about said inner layer.

14. The cable of claim 9, wherein said inner layer comprises a non-woven fibrous material.

15. A method of making a fire retardant plenum cable, said method comprising the steps of;

advancing a conductor which is enclosed in a plastic coating along a path of travel;

wrapping a strip of an aramid fibrous material which has a relatively high compressibility, a relatively low air permeability, and a relatively low heat absorptivity about said conductor;

wrapping a strip of woven glass material which has been impregnated with a fluorocarbon resin about said strip of aramid fibrous material; and extruding a layer of fluoropolymer plastic material about said strip of woven glass material.

16. The method of claim 15, wherein prior to said step of wrapping, said method includes the step of insulating the conductor with polyvinyl chloride plastic material.

17. The method of claim 15, wherein said strip of woven glass material is wrapped helically about said strip of aramid fibrous material.

* * * * *

UNITED STATES PATENT AND TRADEMARK OFFICE
CERTIFICATE OF CORRECTION

PATENT NO. : 4,595,793
DATED : June 17, 1986
INVENTOR(S) : C. J. Arroyo, P. D. Thomas It is certified that error appears in the above-identified patent and that said Letters Patent are hereby corrected as shown below:

In the claims, Column 9, claim 1, line 61, "theral" should read --thermal--.

Signed and Sealed this

Twenty-eighth Day of October, 1986

[SEAL]

Attest:

DONALD J. QUIGG

*Attesting Officer*   *Commissioner of Patents and Trademarks*